United States Patent [19]

Castrilli

[11] Patent Number: 4,884,790

[45] Date of Patent: Dec. 5, 1989

[54] NONLINEAR TORSION SPRING

[76] Inventor: Paul Castrilli, Apt. F5, 280 Bridgewater Road, Brookhaven, Pa. 19015

[21] Appl. No.: 200,920

[22] Filed: Jun. 1, 1988

[51] Int. Cl.[4] ............................................. F16F 1/48
[52] U.S. Cl. ................................. 267/154; 267/273; 267/279; 267/281; 280/723
[58] Field of Search ............... 267/154, 188, 189, 191, 267/273, 276, 271, 277, 279, 280, 281; 280/663, 664, 665, 717, 721, 723, 684

[56] References Cited

U.S. PATENT DOCUMENTS

| | | | |
|---|---|---|---|
| 4,121,813 | 10/1978 | Inuzuka | 267/281 |
| 4,659,069 | 4/1987 | Odobasic | 280/723 X |
| 4,681,307 | 7/1987 | Leonard | 267/273 X |
| 4,768,761 | 9/1988 | Kramer | 267/279 X |

FOREIGN PATENT DOCUMENTS

0184735  9/1985  Japan .................................. 280/721

Primary Examiner—Andres Kashnikow
Assistant Examiner—Matthew C. Graham
Attorney, Agent, or Firm—Robert M. Schulman

[57] ABSTRACT

A nonlinear torsional spring includes an inner torsion member and an outer torsion member. The inner torsion member includes a central axis and has first and second axial ends and the outer torsion member is fixedly secured to the inner member adjacent the first end thereof and extends along the inner member toward the second end. At least one projection and groove are provided in the arrangement for causing the inner member and the outer member to contact one another along the length of the inner member at a position progressively nearer the second end thereof as torque is applied to one of the inner and outer members. The spring may be used as a stabilizer bar in a vehicle and the like or employed in a machine as a nonlinear torsional spring element.

7 Claims, 6 Drawing Sheets

NONLINEAR TORSION SPRING

BACKGROUND OF THE INVENTION

1. Field of the Invention

The present invention relates generally to torsion springs and, more particularly, to a nonlinear torsion spring for use as a spring in a machine or as a stabilizer bar in a vehicle.

2. Description of the Prior Art

In designing vehicles such as automobiles and the like, it is known to use stabilizer bars to control the amount of body roll experienced during cornering. Typically, a passenger vehicle has two stabilizer bars, one working in conjunction with the front suspension, and the other with the rear. Each of these bars is conventionally mounted in two rubber bushings attached to the vehicle frame and is rotatable freely inside the frame bushings. Two arms extend outwardly from the central torsion element of the stabilizer bar and attach to suspension members at either side of the vehicle.

By this construction, when the left and right suspensions rise or fall together, the stabilizer bar merely rotates in its bushings and no force is imparted to either of the suspension members of the vehicle or to the vehicle frame. However, if the vehicle enters a turn, one side of the suspension rises and the other falls due to the roll of the vehicle body caused by the centrifugal forces acting thereon during the turn. This rolling action causes the torsion bars to twist and impart a force to the suspension members and vehicle frame which resists the vehicle's tendency to roll.

In designing stabilizer bars to provide the proper amount of resistance to the rolling forces of the vehicle body, it is conventional to vary the diameter of the stabilizer bar. The thicker the stabilizer bar is, the less roll the vehicle will be permitted to experience. However, the stabilizer bar also has an influence on straight line vehicle behavior which complicates the stabilizer bar design. When a vehicle is traveling in a straight path and one wheel encounters a hole or bump, the stabilizer bar imparts a force to the suspension member because the opposite suspension has not moved relative to the vehicle's frame. If the stabilizer bar is exceptionally stiff, the suspension will not be able to respond quickly enough to follow the contours of the road and the vehicle will roll when a rolling action is undesirable. Such a rolling action produces a feeling of instability for the driver and causes discomfort for passengers. On the other hand, if the stabilizer bar is made soft, the vehicle will experience excessive body roll during cornering. Neither of these situations is desirable.

One type of apparatus which has been designed to balance the effects of the stabilizer bar on the vehicle during straight line and cornering movement is exemplified in U.S. Pat. No. 4,621,831. In the device disclosed in this patent, a stabilizer bar is provided which may be turned on and off to permit the bar to be set either to provide a soft ride over bumps during straight line movement while causing no resistance to rolling during cornering, or to permit responsive handling during cornering while giving a rougher straight line ride. One obvious effect of such a device is that the stabilizer bar must either be completely on or completely off, thus producing sudden unpredictable changes in the roll behavior of the vehicle when going from one operational condition to the other.

An extension of the on-off concept is shown in U.S. Pat. No. 4,648,620, wherein an apparatus is provided having means for permitting a stabilizer bar to exhibit either of two possible spring rate settings. This construction permits the stabilizer bar to produce a soft rate providing a smooth ride in straight line travel of the vehicle and, upon activation of a selection solenoid, produces a stiff rate providing reduced roll during cornering. As with the above-mentioned on-off design, in the design employed in U.S. Pat. No. 4,648,620 a transition occurs when the stabilizer bar is switched from the first setting to the second setting and an abrupt change in the handling of the vehicle may be sensed by the operator. In addition, it is necessary that the vehicle be in a neutral position when the selection is made so that the operator must choose whether soft or hard characteristics are desired prior to putting the vehicle in gear and cannot easily switch between the two during movement of the vehicle.

Several problems are known to exist in conventional stabilizer bar devices. For example, because only one or two different linear spring rates are employed in any one stabilizer bar design of known type, the range of roll characteristics is limited and a choice as to the relative importance of straight line travel comfort versus cornering ability of the vehicle is unavoidable.

OBJECTS AND SUMMARY OF THE DISCLOSURE

It would be advantageous to provide a stabilizer bar which is soft during the initial range of its travel and which becomes progressively stiffer as the suspension moves toward its outer range of travel. Such a construction would allow for minimal interaction between the stabilizer bar and the suspension while the vehicle is in straight line motion, and would also control the amount of roll while the vehicle negotiates a high speed turn.

It is an object of the present invention to provide a nonlinear torsion spring which may be used as a stabilizer bar in a vehicle to provide desired ride characteristics during both straight line and cornering movement of the vehicle.

Another object of the invention is to provide a stabilizer bar which does not require outside control to turn the bar on or off or to change the spring rate from a first linear value to a second linear value, but rather includes a nonlinear torsion spring having spring rate characteristics which inherently produce a desired operation of the stabilizer bar during both straight line and cornering of the vehicle.

Further, it is an object of the invention to provide a nonlinear torsion spring which is simple to construct, inexpensive to produce and which allows a designer to customize the spring rate of the torsional spring according to any desired design application so that a preferred output is achieved throughout the range of twisting movement of the spring.

These and other objects of the present invention are achieved by providing a nonlinear torsional spring including an inner torsion member, an outer torsion member fixedly secured to the inner member adjacent a first end of the inner member and extending toward a second end thereof and contact means for causing the inner member and the outer member to contact one another along the length of the inner member at a position progressively nearer the second end of the inner member as torque is applied to one of the inner and outer members. In a preferred embodiment, the inner torsion member has at least one inner member contact surface extending along an axial segment thereof and the outer torsion member includes at least one outer member contact surface extending along the segment and being displaced circumferentially from the at least one inner member contact surface by a circumferential distance which varies in the axial direction of the segment so that when torque is applied to one of the inner and outer members the at least one inner member contact surface and the at least one outer member contact surface contact each other at a distance progressively nearer the second end of the segment.

In other preferred forms of the invention, the inner member contact surface is formed as a constant width projection extending along the length thereof and the contact surface of the outer member includes a groove having a varying width along the length of the inner member segment. However, other forms of the invention fall within the scope of the claims. For example, it is possible to provide a constant width projection on the outer member and a varying width groove on the inner member, or to provide a constant width groove on one of the members and a varying width projection on the other. Further, it is possible to achieve the desired objects of the invention by employing a plurality of such projections and grooves along the length of the torsion spring rather than the single projection-and-groove arrangement extending down each side of the spring of the preferred embodiment shown in the accompanying drawing.

It is also possible to employ an elastic material such as an elastomer in some or all of the space between the inner torsion member and the outer member to permit additional flexibility in the design of a spring having improved design characteristics, and to control the amount of noise and/or vibration experienced by the spring. Further, the durometer rating of the rubber used in the spring may be made to vary along the length of the spring in order to deliver a desired output. In addition, the thickness of the inner and outer members as well as any rubber layers therebetween may be made to vary along the length thereof to further expand the options available to a designer seeking to maximize the possible range of variation of the spring rate which can occur during a twisting of the torsional spring.

BRIEF DESCRIPTION OF THE DRAWING

A preferred embodiment of the invention is discussed in the following detailed description which should be considered in connection with the figures in the accompanying drawing, in which.

DETAILED DESCRIPTION OF THE PREFERRED EMBODIMENT

Figure 1:
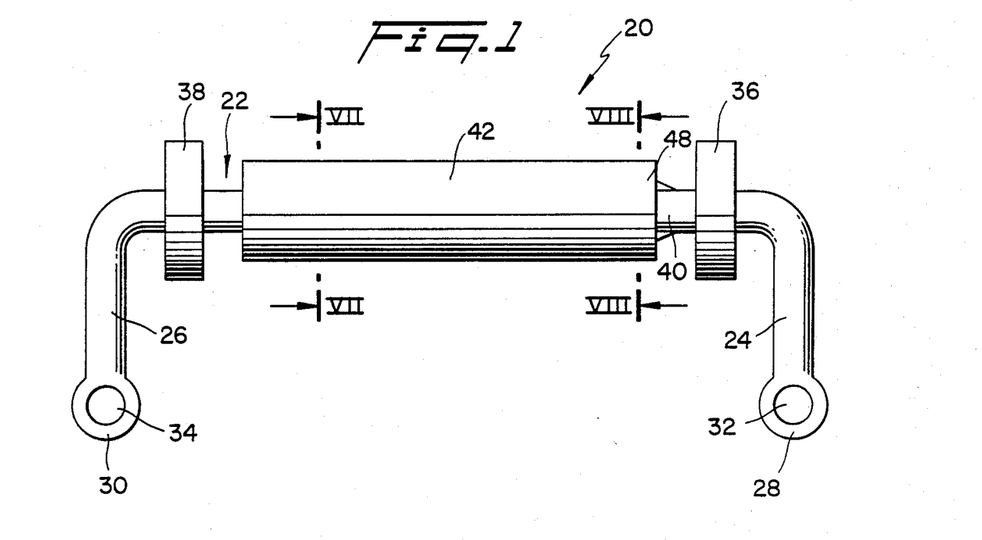
FIG. 1 is a perspective view of a stabilizer bar construction made in accordance with a preferred embodiment of the invention.
Figure 2:
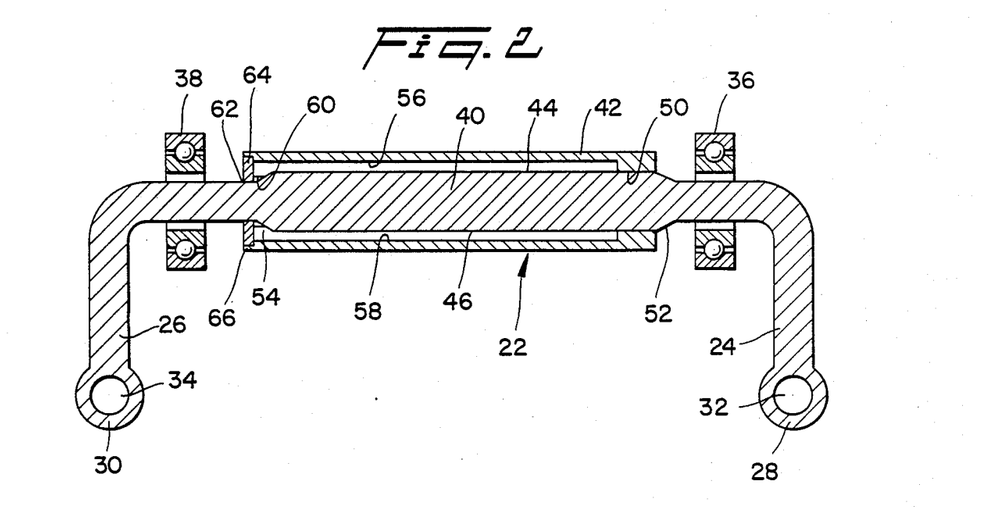
FIG. 2 is a sectional view of the stabilizer bar of FIG. 1.

A preferred embodiment of the present invention will first be discussed with reference to its use in a stabilizer bar of a vehicle of the type illustrated in FIGS. 1 and 2. As shown in FIG. 1, the stabilizer bar 20 consists of a central portion 22 and two end sections 24, 26 which bend outwardly from the central portion 22. At free ends 28, 30 of the end sections 24, 26, stabilizer bar eyelets 32, 34 are provided to permit the stabilizer bar 20 to be attached to the suspension of a vehicle (not shown) of a known type which does not make up any part of the present invention. In addition to being fastened to the suspension at the eyelets 32, 34, the stabilizer bar 20 is mounted to the vehicle frame through bearings 36, 38 located at the axial ends of the central portion 22 of the bar. The central portion 22 is allowed to rotate freely in bearings 36 and 38.

As mentioned in the discussion of the prior art, such a mounting arrangement is not new and is designed to permit rotation of the stabilizer bar when the left and right suspensions of the vehicle rise and fall together. When the vehicle enters a turn, one side of the suspension rises and the other falls due to body roll and the stabilizer bar is caused to twist. This twisting prompts the bar to impart a force on the suspension members and the vehicle frame so as to resist the tendency to roll.

The preferred construction of the stabilizer bar, the central portion 22 of the bar 20 includes an inner torsion member 40 and an outer torsion member 42. As illustrated in FIG. 2, the inner torsion member 40 is a solid bar of any material conventionally used as a spring material in torsion springs and the like. Although the bar 40 is shown as being solid in the drawing, it is understood that the inner torsion member may be formed of a tube or of a noncircular member. As can be seen from FIGS. 7 and 8, the inner member 40 has a constant diameter and includes a pair of projections 44, 46 which extend along a segment of the member and which, themselves have a constant width. The length of the segment is dependent on design application and may extend the entire length of the central portion 22 or along only a small length thereof. In addition, each of the projections 44, 46 may be replaced by any number of tabs or ridges which operate as a means for permitting circumferential contact between the inner and outer members of the spring.

The outer member 42 is formed as a tube having one end 48 closed off except for an opening 50 which accommodates the inner member 40 at a first end 52 thereof and which is fixedly attached to the inner member 40, e.g., by welding or through a pinned connection. An axial hole 54 sized slightly larger than the diameter of the inner member 40 extends through the outer member 42 to receive the inner member and to permit rotation of the inner member 40 relative to the outer member 42. A pair of grooves 56, 58 are provided in the inner surface 60 of the outer member 42 and extend radially outwardly from the axial hole 54. These grooves 56, 58 have a varying circumferential width along the length of the outer member 42 which is only slightly larger than the width of the projections 44, 46 at the first end 52 of the inner member 40, and which increases along the inner member toward the second end 62 thereof. A sealing member 64 is included at a second end 66 of the outer member 42 which closes off the grooves 56, 58 from exposure to the area outside the torsional spring arrangement. This sealing member 64 may be held on the outer member 42 and allowed to rotate relative to the inner member 40, or may be attached to the inner member.

Figure 3:
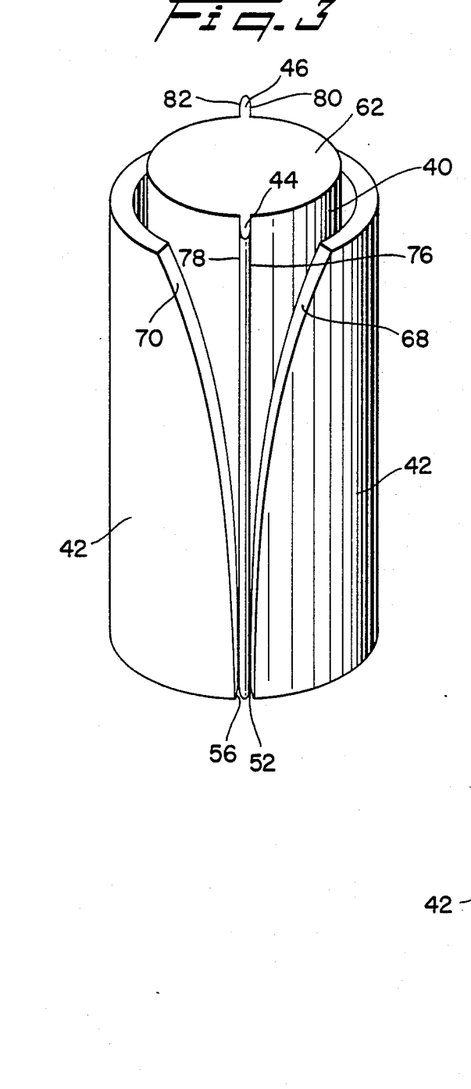
FIG. 3 is a conceptual view of a nonlinear torsion spring at rest, in accordance with a preferred embodiment of the invention.
Figure 4:
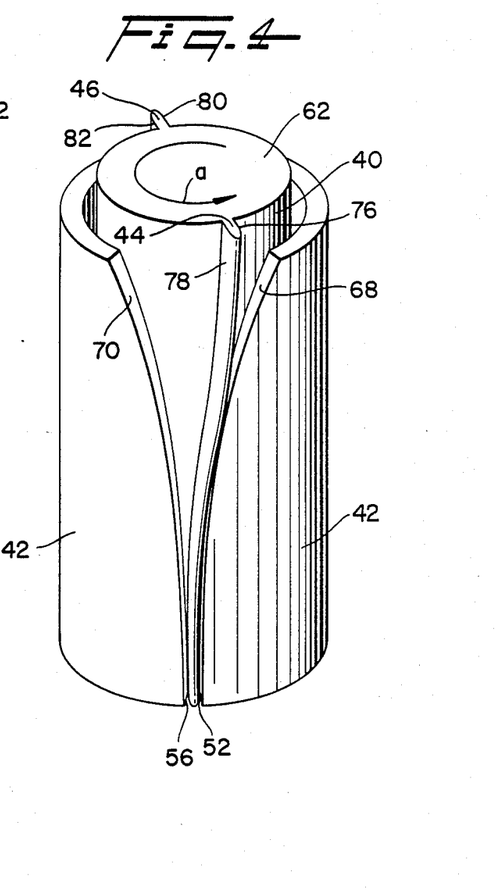
FIG. 4 is a conceptual view of the spring of FIG. 3 after the application of torque to the inner torsion member.

A conceptual view of the torsional spring of the present invention is shown in FIGS. 3 and 4. In FIG. 3, an inner torsion member similar to the member 40 includes a pair of opposed projections 44, 46 extending along the length thereof and having a constant width. An outer torsion member 42 includes a pair of grooves 56, 58 mated up with the projections 44, 46 and having a varying width along the length of the members so that the radially extending surfaces 68, 70, 72, 74 of the grooves are nearly touching the radially extending surfaces 76, 78, 80, 82 of the projections at the lower or first end 52 of the inner member 40 and are widely separated from the radial surfaces of the inner member at the upper or second end 62 thereof.

As the inner member 40 is twisted, as shown by the arrow a in FIG. 4, the projections 44, 46 on the inner member 40 come into contact with the sides of the grooves 56, 58 near the lower end 52 of the inner member. This contact between the inner and outer members causes the members to move together in the region below the point of contact so that the spring rate of the spring is made to vary from the constant rate exhibited by the inner member were it acting alone. Upon further twisting of the inner member 40 relative to the outer member 42, the point of contact between the inner and outer members moves upwardly toward the second end 62 of the inner member and the spring rate continually changes to produce a nonlinear rate. The value of this nonlinear rate is dependent partially upon the length of the inner member 40 which is twisting independently of the outer member 42 and the length of the inner and outer members which is twisting cooperatively.

Thus, a designer of torsional springs for use in, e.g. stabilizer bars, may form the groove and projection surfaces in any number of ways to vary the spring rate in a fashion which will ensure the most comfortable ride during straight line travel of a vehicle and the safest ride during cornering. In addition, it is possible to further influence the variation of the spring rate by varying the thickness of the inner and outer members.

In the initial stages of twisting, the torsion spring exhibits a very low spring rate. In the environment of a stabilizer bar, this low rate permits one or the other of the wheels to experience small amounts of vibration or road shock without the force being transmitted to the opposite wheel. As the amount of twisting increases, the rate increases to create a much stiffer spring response than exists at the beginning stages of twisting. When such a construction is employed in vehicle stabilizer bars, the bar will exhibit a steadily increasing amount of stiffness as one of the wheels rises or falls relative to the other, such as during turning. This increasing stiffness prevents the vehicle from rolling so as to give the operator a feeling of control.

Figure 5:
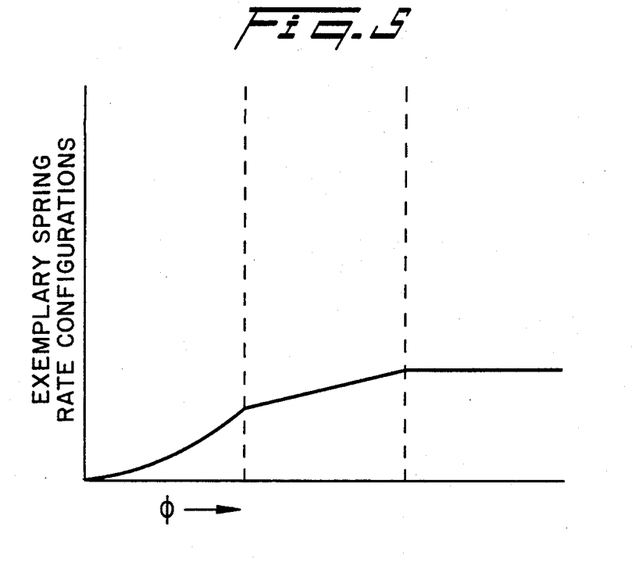
FIG. 5 is a table showing the relationship between the spring rate of a torsion spring made in accordance with the invention and the angle of twisting in one direction only of one of the torsion members thereof.

In FIG. 5 there is shown a graph of exemplary spring rates of a preferred embodiment of the inventive arrangement versus the angle of twisting thereof.

In the graph, the spring rates are shown only for one direction of twisting, and are merely exemplary of rates capable of being provided by the preferred construction of the invention. The illustrated spring rate curve includes a first section exhibiting an approximately squared relationship between the spring rate and the degree of twist, a second ramped section, and an approximately constant third section.

Figure 6:
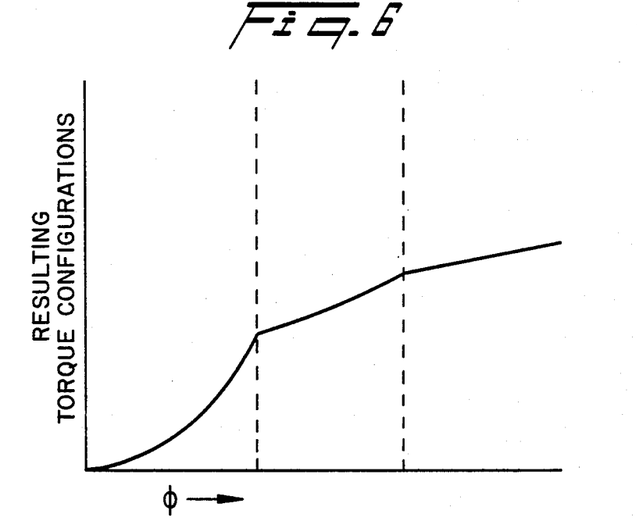
FIG. 6 is a table showing a torque curve corresponding to FIG. 5.

In FIG. 6, a graph is provided corresponding to FIG. 5, wherein the amount of torque exerted by the spring is shown relative to the amount of twisting thereof. With reference to the above discussion regarding the use of the inventive arrangement in a stabilizer bar, it may be seen that although little torque is created by a small twisting of the spring, as the amount of twisting increases, the force exerted by the bar may increase nonlinearly so as to ensure that a rolling action of a vehicle occurring during turning will be adequately opposed by the bar. Such a construction guarantees that the vehicle will ride smoothly during straight line travel even if small holes or bumps are encountered by one of the wheels, and that the rolling effect caused by centrifugal forces during turning will be negated by the reaction force generated by the bar.

Figures 7, 8:
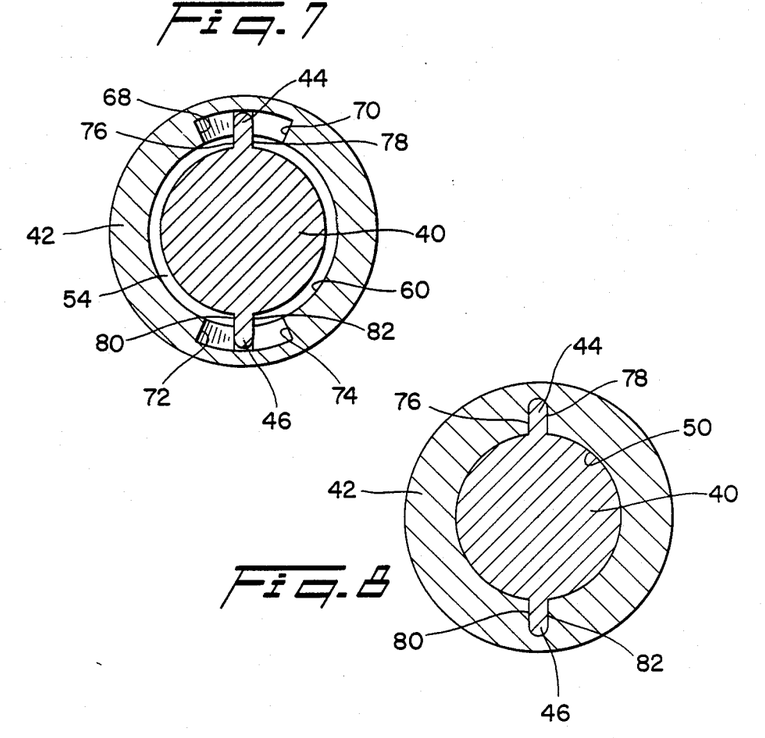
FIG. 7 is a sectional view taken along line VII—VII of FIG. 1, of the nonlinear torsion spring employed in the stabilizer bar.
FIG. 8 is a sectional view taken along line VIII—VIII of FIG. 1, of the nonlinear torsion spring of the invention.

Returning to the arrangement of the present invention, in FIG. 7 there is shown a sectional end view of the torsion spring of the preferred embodiment. As can be seen from this figure, as well as from FIGS. 9 and 10, the circumferential width of the grooves 56, 58 increases in the axial direction of the members so that the radial surfaces 68, 70, 72, 74 of the grooves are located opposite the radial surfaces 76, 78, 80, 82 of the projections 44, 46 at a distance which varies in the axial direction. A small clearance 84 is provided between the grooves 56, 58 and the projections 44, 46 radially outwardly of the tips of the projections to permit rotation of the inner member 40 relative to the outer member 42.

The surfaces 72, 74, 76, 78 of the grooves are formed symmetrically with respect to the surfaces 76, 78, 80, 82 of the inner member to cause a consistent operation of the torsion spring in both directions of rotation of the inner member 40. Although the grooves 56, 58 shown in the figures are shaped with surfaces varying almost constantly along the length of the members, it is possible to alter the shape of the grooves 56, 58 so that, e.g. a segment of the outer member 42 is activated upon contact between the projections 44, 46 and a section of the groove surfaces.

Figure 9:
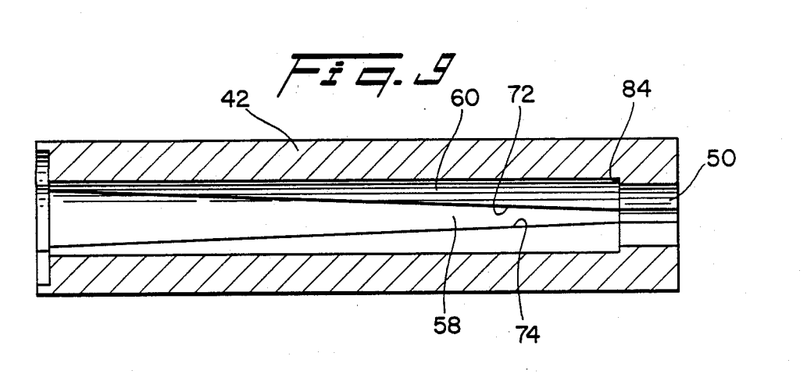
FIG. 9 is a plan sectional view of the outer torsion member of the torsion spring shown in FIG. 1.
Figures 10, 11:
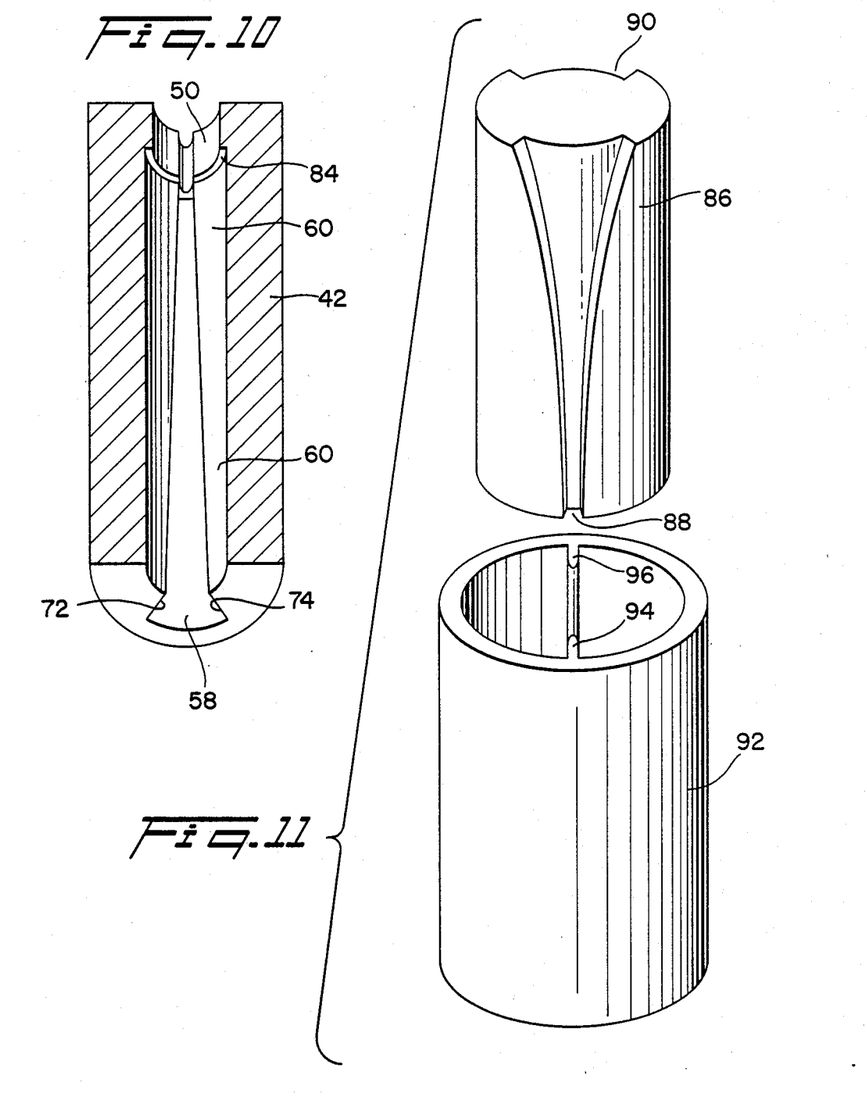
FIG. 10 is a sectional perspective view of an outer torsion member made in accordance with the preferred embodiment of the invention.
FIG. 11 is a perspective view of a second embodiment of the invention.

In FIG. 9, the outer member 42 is illustrated separate from the inner member 40 in order that a groove 58 of the outer member 42 may be observed. As shown in FIG. 10, a small clearance 84 is formed in the hole through the outer member 42, except at the first end 48 at which the outer and inner members are secured to one another, to permit rotation of the inner member 40 relative thereto.

Alternatively, the fit provided between the lateral surfaces of the projections 44, 46 and the grooves 56, 58 near the end 52 of the inner member may be made tight enough that no region of reduced clearance is necessary.

The first end of the torsion spring is shown in FIG. 8. The inner member 40 is snugly fitted in the opening 50 of the outer member 42 and the outer member is fixedly secured to the inner member 40 to prevent relative movement between the members at the point of attachment. The members are secured to each other by known means.

In FIG. 11, an alternative embodiment is illustrated in which an inner member 86 is provided with grooves 88, 90 and an outer member 92 includes a pair of projections 94, 96. The manner of operation of this embodiment is identical to the embodiment discussed above with the parts of the contact means between the members being reversed.

Figures 12, 13:
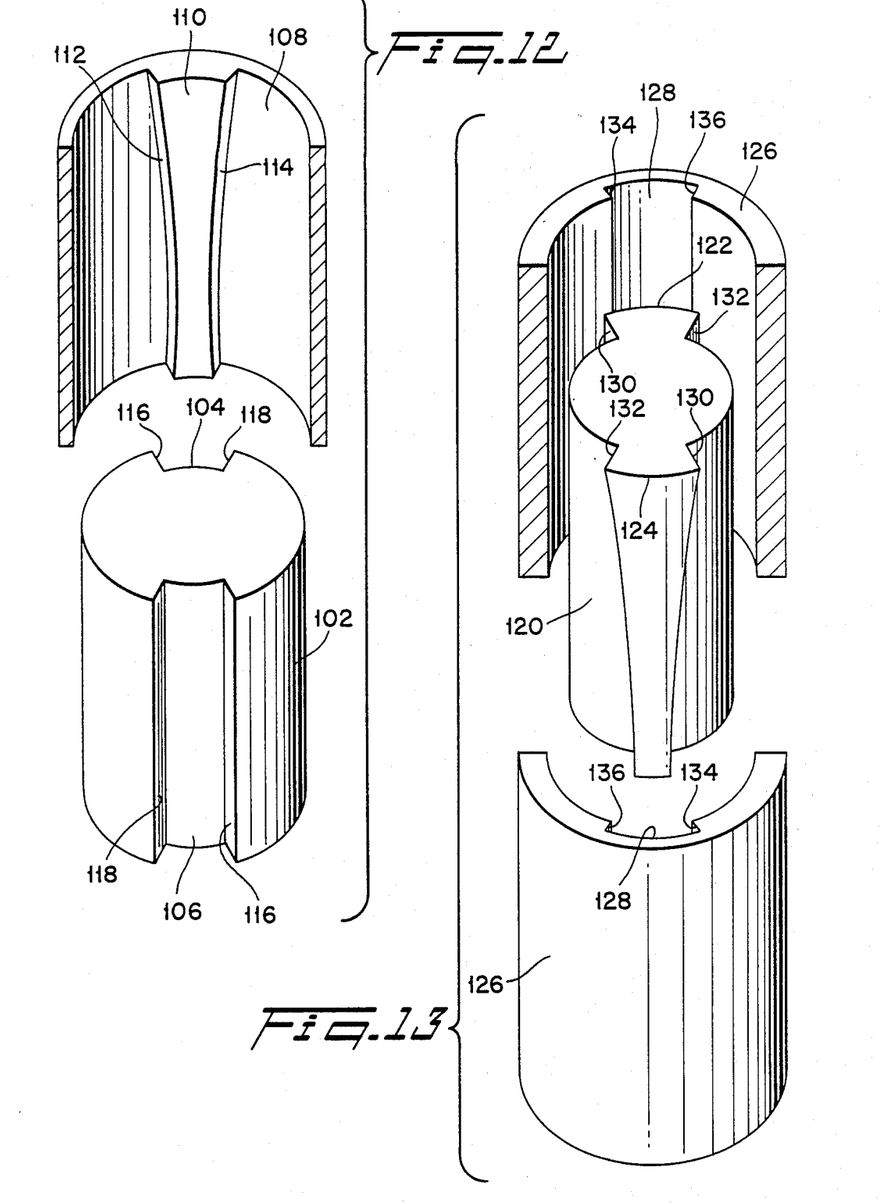
FIG. 12 is a perspective view of another embodiment of the invention.
FIG. 13 is a perspective view of a further embodiment of the invention.

As shown in FIG. 12, a further embodiment of the inventive spring includes an inner member 102 provided with grooves 104, 106 and an outer member 108 having projections 110, only one of which is illustrated. In this embodiment, the projections 110 have side surfaces 112, 114 which are curved in the axial direction of the outer member 108, while the sides 116, 118 of the grooves 104, 106 are straight.

The embodiment illustrated in FIG. 13 includes an inner member 120 provided with projections 122, 124 and an outer member 126 having grooves 128. The sides 130, 132 of the projections 122 are curved in the axial direction of the member, while the sides 134, 136 of the grooves 128 are straight. Both of the embodiments shown in FIGS. 12 and 13 operate in the manner discussed above with regard to the embodiment of FIG. 3, and the same advantages may be realized from these alternative embodiments.

As mentioned above, by employing the present invention in a stabilizer bar arrangement, it is possible to achieve many advantages. For example, without the need for any outside mechanisms or control devices, it is possible through the use of the present invention, to provide a stabilizer bar which feels soft during small relative up and down movements of either of the wheels, but which responds aggressively during cornering to prevent the unwanted occurrence of rolling of the vehicle. These objects are achieved with a construction which is relatively simple and inexpensive and which is extremely versatile in the manner in which it may be modified to specific purposes.

Although the invention has been illustrated and described in accordance with a preferred embodiment, it is recognized that variations and changes may be made and equivalents employed herein without departing from the invention as set forth in the claims.

What is claimed is:

1. A nonlinear torsional spring comprising:
    a flexible and resilient inner torsion member having a central axis and first and second axial ends;
    an outer torsion member fixedly secured to the inner member adjacent the first end thereof and extending along the inner member toward the second end;
    a contact means on one of the inner and outer members which contacts a portion of the other of the inner and outer members along an increasing length of the contact means at a position progessively nearer the second axial end as an increasing torque is applied to one of the inner and outer members.

2. The nonlinear torsional spring according to claim 1, wherein the contact means includes a projection on one of the inner and outer members, and a groove is located on the other of the inner and outer members, the projection including two projection surfaces and the groove including two groove surfaces, the groove surfaces being displaced circumferentially from the projection surface by a circumferential distance which varies in the axial direction of the inner torsion member.

3. The nonlinear torsional spring according to claim 2, wherein the projection surfaces extend in a direction parallel to the central axis.

4. The nonlinear torsional spring according to claim 2, wherein the groove surfaces are curved relative to the central axis.

5. The nonlinear torsional spring according to claim 4, wherein the amount of curvature of the groove varies in the axial direction of the inner and outer members.

6. The nonlinear torsional spring according to claim 2, wherein the contact means includes a plurality of projections and grooves.

7. A nonlinear torsional spring comprising:
    a flexible and resilient inner torsion member having a central axis and at least one inner member contact surface extending along an axial segment thereof, the segment having first and second axial ends;
    an outer torsion member fixedly attached to the inner member adjacent the first end of the segment and extending along said segment toward the second end, the outer member including at least one outer member contact surface extending along the segment and being displaced circumferentially from the at least one inner member contact surface by a circumferential distance which varies in the axial direction of the segment so that when torque is applied to one of the inner and outer members the at least one inner member contact surface and the at least one outer member contact surface contact each other along their length at a distance progressively nearer the second end of the segment.

* * * * *